United States Patent
Kirimoto

(10) Patent No.: US 9,963,043 B2
(45) Date of Patent: May 8, 2018

(54) CONTROL SYSTEM AND VEHICLE POWER SUPPLY

(71) Applicant: SANYO Electric Co., Ltd., Osaka (JP)

(72) Inventor: Mika Kirimoto, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days. days.

(21) Appl. No.: 15/100,643

(22) PCT Filed: Dec. 10, 2014

(86) PCT No.: PCT/JP2014/006152
§ 371 (c)(1),
(2) Date: Jun. 1, 2016

(87) PCT Pub. No.: WO2015/098012
PCT Pub. Date: Jul. 2, 2015

(65) Prior Publication Data
US 2016/0297318 A1    Oct. 13, 2016

(30) Foreign Application Priority Data
Dec. 27, 2013    (JP) .................................. 2013-271943

(51) Int. Cl.
*B60L 11/18*    (2006.01)
*B60K 6/48*    (2007.10)
(Continued)

(52) U.S. Cl.
CPC ............ *B60L 11/1861* (2013.01); *B60K 6/48* (2013.01); *B60L 3/12* (2013.01); *B60L 7/18* (2013.01);
(Continued)

(58) Field of Classification Search
CPC .......... B60W 2510/244; B60W 10/08; B60W 10/26; B60W 20/00; B60W 20/13;
(Continued)

(56) References Cited

U.S. PATENT DOCUMENTS

2007/0118255 A1*  5/2007  Wakashiro ............. B60K 6/485
                                                                701/22
2009/0039815 A1   2/2009  Fujino et al.
(Continued)

FOREIGN PATENT DOCUMENTS

| | | |
|---|---|---|
| JP | 2007-151216 | 6/2007 |
| JP | 2009-044808 | 2/2009 |

(Continued)

OTHER PUBLICATIONS

International Search Report of PCT application No. PCT/JP2014/006152 dated Feb. 17, 2015.

*Primary Examiner* — Yuen H Wong
(74) *Attorney, Agent, or Firm* — McDermott Will & Emery LLP

(57) ABSTRACT

Degradation degree table is a degradation degree table that describes a degradation degree of a secondary battery when the secondary battery is charged or discharged at a prescribed current rate with prescribed frequency. Degradation degree table describes the degradation degree in each of a plurality of state of charge (SOC) regions obtained through division of an SOC range of the secondary battery into the plurality of regions. Upper limit current determining part determines an upper limit current value to be used as a current rate at a time of charge or discharge, based on an estimated SOC and a target degradation degree with reference to degradation degree table.

17 Claims, 12 Drawing Sheets

(51) Int. Cl.
  *B60W 10/08* (2006.01)
  *B60W 10/26* (2006.01)
  *B60W 20/00* (2016.01)
  *H01M 10/48* (2006.01)
  *B60W 20/13* (2016.01)
  *H02J 7/00* (2006.01)
  *B60L 3/12* (2006.01)
  *B60L 7/18* (2006.01)
  *B60L 15/20* (2006.01)

(52) U.S. Cl.
  CPC ....... *B60L 11/1809* (2013.01); *B60L 11/1862* (2013.01); *B60L 15/20* (2013.01); *B60W 10/08* (2013.01); *B60W 10/26* (2013.01); *B60W 20/00* (2013.01); *B60W 20/13* (2016.01); *H01M 10/48* (2013.01); *H02J 7/0075* (2013.01); *B60L 2240/545* (2013.01); *B60L 2240/547* (2013.01); *B60L 2240/662* (2013.01); *B60L 2260/42* (2013.01); *B60W 2510/244* (2013.01); *B60W 2510/248* (2013.01); *B60Y 2200/92* (2013.01); *H01M 2220/20* (2013.01); *Y02T 10/6221* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7275* (2013.01); *Y02T 10/7291* (2013.01); *Y02T 90/14* (2013.01); *Y02T 90/16* (2013.01)

(58) Field of Classification Search
  CPC ......... B60W 2510/248; B60Y 2200/92; B60K 6/48; B60K 6/54; B60L 3/00; B60L 11/18; B60L 11/1861; B60L 15/20; B60L 11/1809; B60L 7/18; B60L 3/12; B60L 11/1862; B60L 2260/42; B60L 2240/662; B60L 2240/547; B60L 2240/545; H01M 10/48; H01M 2220/20; Y02T 10/6221; Y02T 10/7005; Y02T 10/7044; Y02T 10/72; Y02T 90/14; Y02T 10/7291; Y02T 10/7275; Y02T 10/645; Y02T 10/7072; Y02T 90/16; Y02T 10/705; H02J 7/0075
  See application file for complete search history.

(56) References Cited

U.S. PATENT DOCUMENTS

2013/0271148 A1  10/2013  Maeda
2014/0339891 A1  11/2014  Ohkawa et al.

FOREIGN PATENT DOCUMENTS

| JP | 2011-168241 | 9/2011 |
| WO | 2012/091077 | 7/2012 |
| WO | 2013/094057 A1 | 6/2013 |

\* cited by examiner

SENSOR INFORMATION, OPERATIONAL INFORMATION

| POWER RUNNING UPPER LIMIT SPEED | DEGRADATION DEGREE (DURING DISCHARGE) | REGENERATIVE UPPER LIMIT SPEED | DEGRADATION DEGREE (DURING CHARGE) |
|---|---|---|---|
| 30km/h | LARGE | 40km/h | LARGE |
| 35km/h | MEDIUM(NORMAL) | 60km/h | MEDIUM(NORMAL) |
| 40km/h | SMALL | 80km/h | SMALL |

21

CONTROL SYSTEM AND VEHICLE POWER SUPPLY

TECHNICAL FIELD

The present invention relates to a control system that controls a secondary battery to be mounted in a vehicle, and a vehicle power supply device.

BACKGROUND ART

In recent years, low-$CO_2$ emission, fuel-efficient hybrid cars (HEVs; Hybrid Electric Vehicles) have been increasingly common. Such a hybrid car is mounted with a motor as a power source other than an engine, and a secondary battery for supplying electric power to the motor. The vehicle-mounted secondary battery typically employs a lithium ion battery or nickel hydride battery. In order to control energy balance of the vehicle-mounted secondary battery, changing a current rate for each state of charge (SOC) range of the secondary battery is known (for example, refer to Patent Literature 1).

CITATION LIST

Patent Literature

Patent Literature 1; Japanese Laid-Open Patent Publication No. 2007-151216

SUMMARY OF THE INVENTION

However, the secondary battery has SOC regions in which the secondary battery degrade easily by charge and discharge, and SOC regions in which the secondary battery does not degrade easily. These regions differ depending on a type and specification of the battery. For example, degradation caused by charge and discharge decreases in a region in which the SOC is around 50% in some batteries, while degradation decreases in a region in which the SOC is high in other batteries. Charge and discharge at a high current rate in the SOC region in which the secondary battery degrades easily without consideration of such characteristics of the secondary battery, will accelerate degradation.

The present invention is developed for the purpose of solving such requirements. One non-limiting and explanatory embodiment provides a technique for inhibiting degradation of the secondary battery.

A control system according to one aspect of the present invention includes: first associated data that describes a degradation degree of a secondary battery when the secondary battery is charged or discharged at a prescribed current rate, the first associated data describing the degradation degree in each of a plurality of state of charge (SOC) regions obtained through division of an SOC range of the secondary battery into the plurality of regions; a monitoring data acquiring part that acquires monitoring data from the secondary battery; an SOC estimating part that estimates the SOC of the secondary battery based on the acquired monitoring data; and an upper limit current determining part that determines an upper limit current value to be used as a current rate at a time of charge or discharge based on the estimated SOC and a target degradation degree with reference to the first associated data.

Another aspect of the present invention is also a control system. This control system is a control system for controlling a secondary battery for supplying electric power to a motor for vehicle running. The control system includes: first associated data that describes a degradation degree of the secondary battery when the secondary battery is charged or discharged at a prescribed current rate, the first associated data describing the degradation degree in each of a plurality of state of charge (SOC) regions obtained through division of an SOC range of the secondary battery into the plurality of regions; second associated data that associates a relationship between the degradation degree of the secondary battery and an upper limit speed at which the motor provides a running assist to the vehicle; a monitoring data acquiring part that acquires monitoring data from the secondary battery; an SOC estimating part that estimates the SOC of the secondary battery based on the acquired monitoring data; and an upper limit speed determining part that specifies the degradation degree based on the estimated SOC with reference to the first associated data, the upper limit speed determining part determining the upper limit speed at which the motor provides a running assist based on the degradation degree with reference to the second associated data.

Still another aspect of the present invention is a vehicle power supply device. This vehicle power supply device includes a secondary battery for supplying electric power to a motor for vehicle running, and the control system that controls the secondary battery.

Note that an arbitrary combination of the aforementioned configuration elements, and mutual replacement of the configuration elements or representation of the present invention between methods, devices, systems, and programs are also valid as an aspect of the present invention.

The present invention can inhibit degradation of a secondary battery.

DESCRIPTION OF EMBODIMENTS

Figure 1:
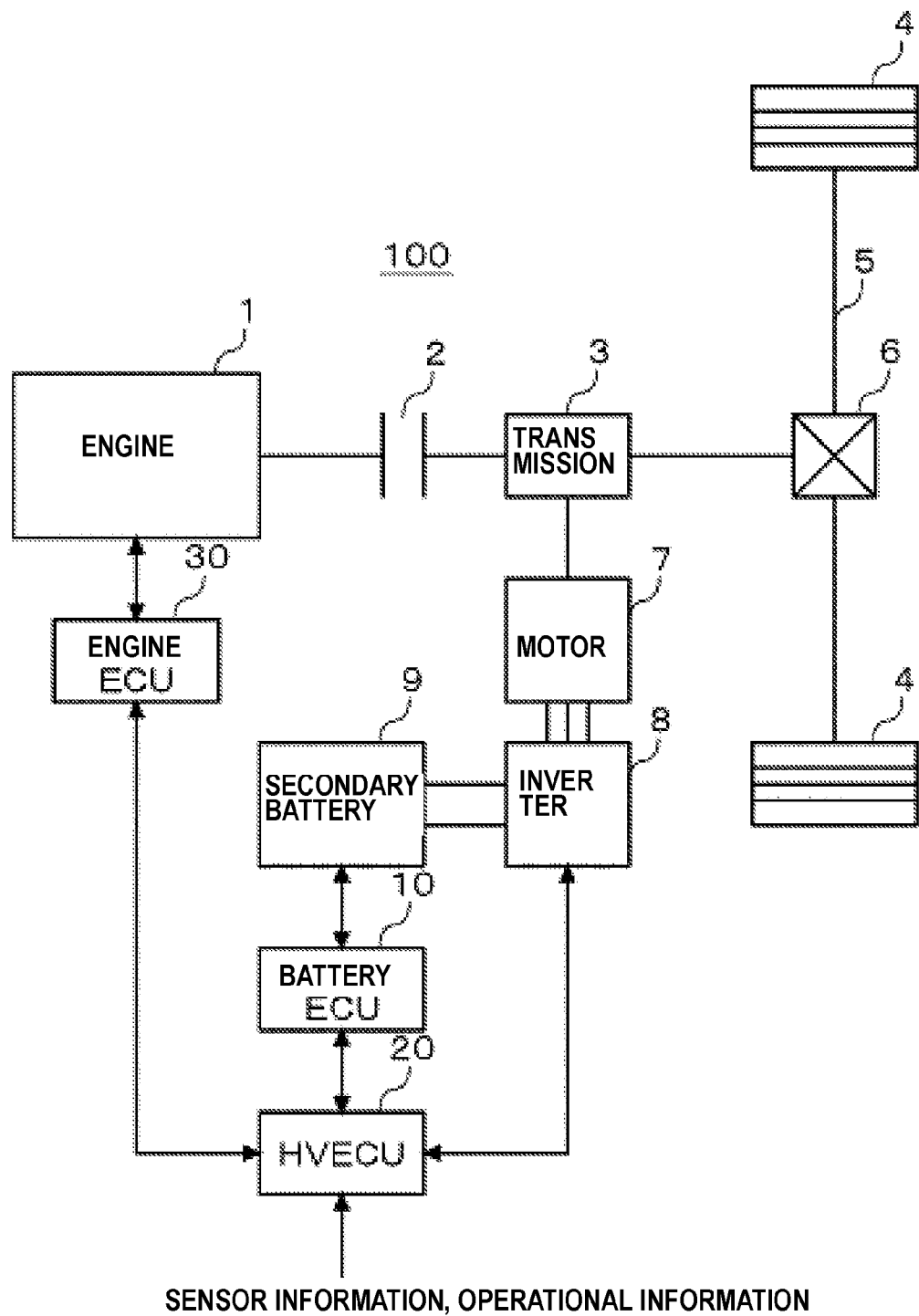
FIG. 1 is a diagram illustrating a schematic configuration of a vehicle according to an exemplary embodiment of the present invention.

FIG. 1 is a diagram illustrating a schematic configuration of vehicle 100 according to an exemplary embodiment of the present invention. The present exemplary embodiment assumes mild hybrid type vehicle 100. Hybrid cars are roughly classified into a strong hybrid type and a mild hybrid type. The strong hybrid type is a type of car that is mounted with a relatively large secondary battery and a motor, and that can run using energy stored in the secondary battery even when an engine is at a standstill. The mild hybrid type is a type of car that is mounted with a relatively small secondary battery and a motor, that does not run when an engine is at a standstill in principle, and that mainly provides a power assist using energy stored in the secondary battery. The mild hybrid type, which is less fuel-efficient than the strong hybrid type, has simple structure and can be made at a relatively low cost. The mild hybrid type typically employs a parallel method. The parallel method is a method for allowing a wheel to be driven by both the engine and the motor. In contrast, the serial method is a method for storing energy generated by the engine in the secondary battery to drive a wheel only by the motor.

Vehicle 100 illustrated in FIG. 1 includes engine 1 and motor 7 as a power source. Clutch 2 and transmission 3 are disposed at a shaft on the same axis as an output shaft of engine 1. Transmission 3 transfers rotation of motor 7 to the shaft at a predetermined conversion ratio. The shaft is coupled to rotation axle 5 of wheels 4 via differential gear 6.

Secondary battery 9 is a secondary battery that stores electric power to be supplied to motor 7. Secondary battery 9 is provided separately from a secondary battery of a 12-volt system for auxiliaries (a lead-acid battery is usually used). In the present exemplary embodiment, using a lithium ion battery as secondary battery 9 is assumed. Specifically, an assembled battery of a 48-volt system made of a plurality of lithium ion battery cells connected in series or in series parallel is assumed. The mild hybrid type typically uses a power supply system of equal to or lower than 60 V that does not need strict insulation processing as a power supply system for a drive motor. Note that the strong hybrid type typically uses a power supply system of equal to or higher than 200V.

Secondary battery 9 is also capable of supplying electric power to loads of a 48-volt system other than motor 7, and may also be connected to the 12-volt power supply system via an unillustrated DC/DC converter. For simple description, connection with loads other than motor 7 and connection with the 12-volt power supply system are neglected in the following description.

At the time of power running, inverter 8 converts direct current power supplied from secondary battery 9 into alternating current power to supply the converted alternating current power to motor 7. At the time of regeneration, inverter 8 converts alternating current power supplied from motor 7 into direct current power to supply the converted direct current power to secondary battery 9.

For example, a small three-phase alternating current synchronous motor is used for motor 7. In a power running mode, motor 7 rotates based on electric power supplied from inverter 8 to assist the vehicle in starting and accelerating. Note that in a low-speed region, a mode in which the vehicle can run only by a driving force of motor 7 may be set. In a regenerative mode, motor 7 generates electric power by rotation based on deceleration energy of the vehicle, and then outputs the generated electric power to inverter 8.

Battery electronic control unit (ECU) 10 manages or controls secondary battery 9 in cooperation with HV ECU 20. Engine ECU 30 manages or controls engine 1 in cooperation with HV ECU 20. HV ECU 20 comprehensively controls a drivetrain of vehicle 100 including engine 1 and motor 7. A controller area network (CAN) connects between battery ECU 10 and HV ECU 20, between engine ECU 30 and HV ECU 20, and between inverter 8 and HV ECU 20.

Figure 2:
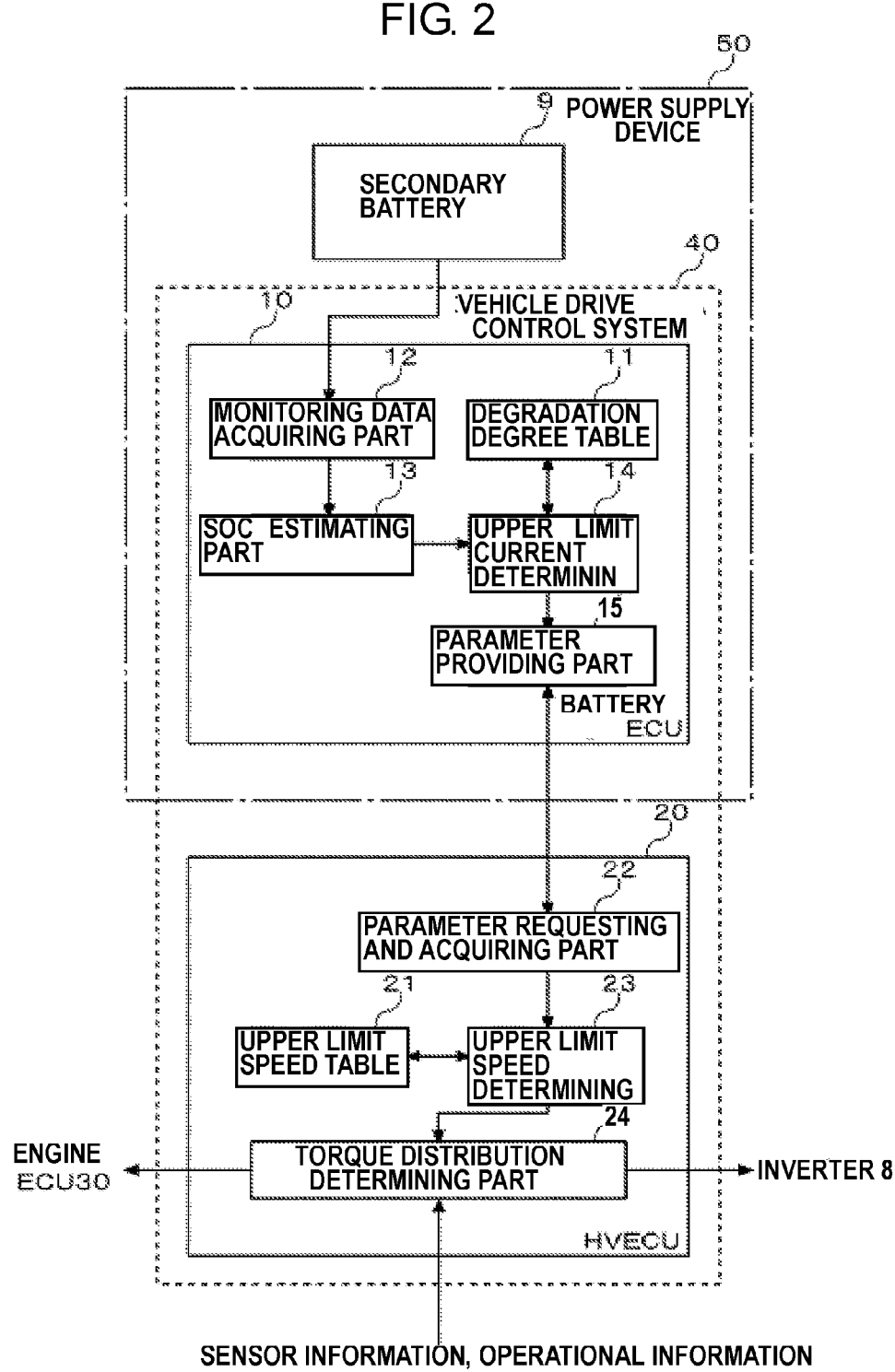
FIG. 2 is a diagram illustrating a configuration example of a battery electronic control unit (ECU) and an HV ECU according to the exemplary embodiment of the present invention.

FIG. 2 is a diagram illustrating a configuration example of battery ECU 10 and HV ECU 20 according to the exemplary embodiment of the present invention. In the present exemplary embodiment, secondary battery 9 and battery ECU 10 are collectively referred to as power supply device 50. In addition, battery ECU 10 and HV ECU 20 are collectively referred to as vehicle drive control system 40.

Battery ECU 10 includes degradation degree table 11, monitoring data acquiring part 12, SOC estimating part 13, upper limit current determining part 14, and parameter providing part 15. HV ECU 20 includes upper limit speed table 21, parameter requesting and acquiring part 22, upper limit speed determining part 23, and torque distribution determining part 24.

Each configuration of battery ECU 10 and HV ECU 20 may be implemented by an arbitrary processor, memory, and other large-scale integrated circuits (LSIs) hardware-wise, and may be implemented by a program loaded in the memory and the like software-wise. Here, functional blocks implemented by cooperation of these elements are illustrated.

Therefore, the person of ordinary skill in the art will appreciate that these functional blocks may be implemented in various forms by only hardware, by only software, or by combination of hardware and software.

Degradation degree table 11 is a table that describes a degradation degree of secondary battery 9 when secondary battery 9 is charged or discharged with prescribed frequency at a prescribed current rate. Specific description will be given below.

Figure 3:
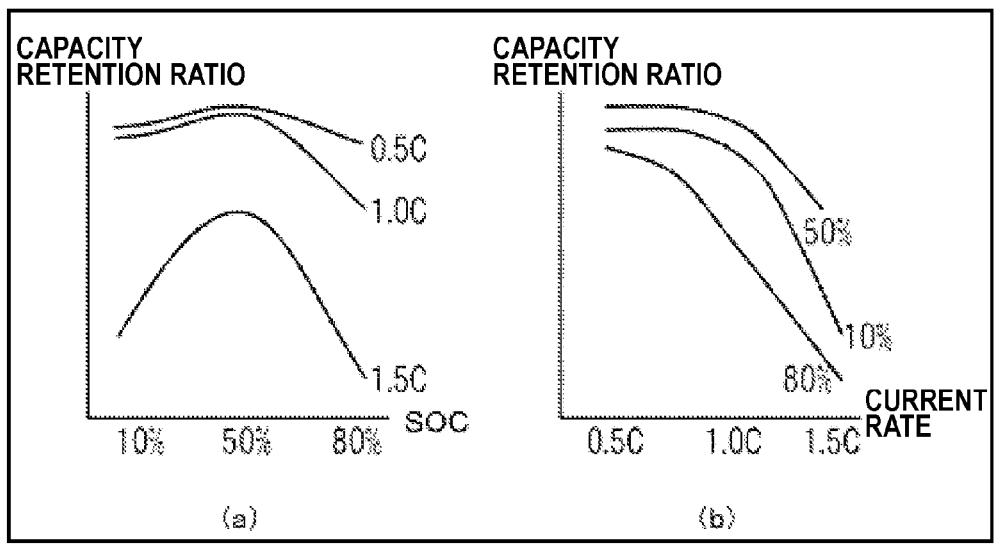
FIG. 3 is each of diagrams illustrating characteristics of a battery A.
Figure 4:
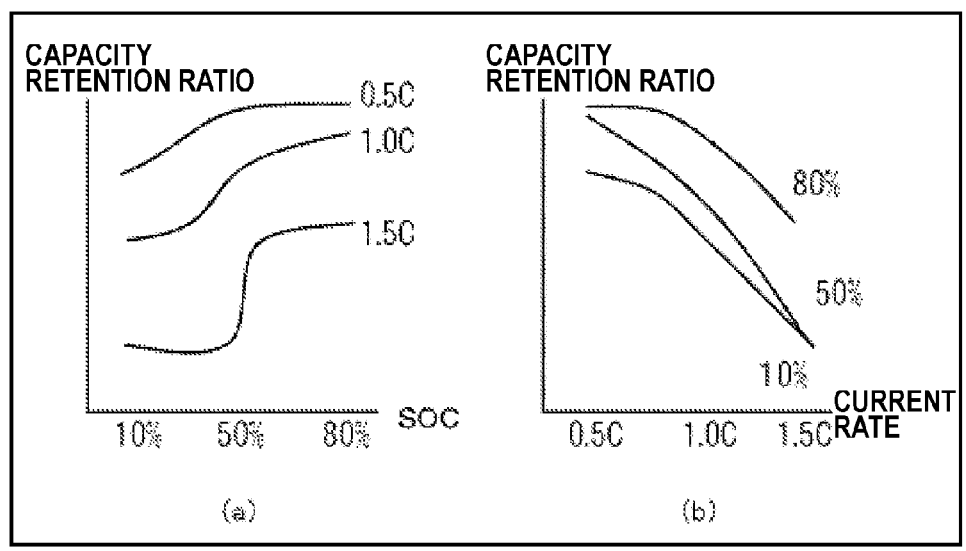
FIG. 4 is each of diagrams illustrating characteristics of a battery B.

Sections (a) and (b) of FIG. 3 are diagrams illustrating characteristics of a battery A. The section (a) of FIG. 3 is a diagram illustrating a capacity retention ratio when the battery A is charged or discharged with prescribed frequency at different SOCs. The section (b) of FIG. 3 is a diagram illustrating the capacity retention ratio when the battery A is charged or discharged with prescribed frequency at different current rates. Sections (a) and (b) of FIG. 4 are diagrams illustrating characteristics of a battery B. The section (a) of FIG. 4 is a diagram illustrating the capacity retention ratio when the battery B is charged or discharged with prescribed frequency at different SOCs. The section (b) of FIG. 4 is a diagram illustrating the capacity retention ratio when the battery B is charged or discharged with prescribed frequency at different current rates. The capacity retention ratio is a ratio of capacity after charge or discharge with prescribed frequency to capacity before charge or discharge. A higher capacity retention ratio means less degradation of the battery.

The battery A differs from the battery B in type. As illustrated in the section (a) of FIG. 3, for the battery A, the capacity retention ratio is high when the battery A is charged or discharged at the SOC of around 50%, and the capacity retention ratio decreases as the SOC deviates from 50%. This tendency is more remarkable as the current rate increases. In contrast, as illustrated in the section (a) of FIG. 4, for the battery B, the capacity retention ratio increases as the battery B is charged or discharged at higher SOC. This tendency is more remarkable as the current rate increases. That is, for the battery A, a region near the SOC of 50% is a low-degradation region, and using the battery A in this region may extend a battery service life. In contrast, for the battery B, the region near the SOC of 80% is the low-degradation region, and using the battery B in this region may extend a battery service life.

Regarding the current rate, basically, the capacity retention ratios of the battery A and the battery B both increase as the battery A and the battery B are charged or discharged at the lower current rate. However, the capacity retention ratio changes depending on the SOC. For example, when the battery A and the battery B are charged or discharged at the current rate of 1.0 C at the SOC of 10%, the battery A has higher capacity retention ratio than the battery B does. That is, when identical degradation is accepted at the SOC of 10%, the battery A may be charged or discharged at a higher current rate than the battery B can.

Thus, it is appreciated that, when the battery is charged or discharged, there is an SOC region in which the battery does not degrade easily, and an SOC region in which the battery degrades easily. In addition, it is appreciated that the SOC region in which the battery does not degrade easily and the SOC region in which the battery degrades easily, differ depending on the type of battery. In addition, it is appreciated that, even if charge or discharge is performed at an identical current rate, how easily the battery degrades differs depending on the type of battery and/or on the SOC region.

Degradation degree table 11 is a degradation degree table that describes the degradation degree when charge or discharge is performed at a plurality of current rates in each of a plurality of the SOC regions obtained by dividing an SOC range of the battery A into the plurality of regions (hereinafter referred to as degradation degree maps as needed). This degradation degree is an index that prescribes the aforementioned capacity retention ratio from a viewpoint of degradation. The degradation degree decreases as the capacity retention ratio increases, and conversely, the degradation degree increases as the capacity retention ratio decreases.

A designer carries out, for example, a charge and discharge test with prescribed frequency at each prescribed current rate in every region of the SOC of 10% to derive the degradation degree under each condition. The aforementioned degradation degree maps organize such degradation degree under each condition obtained by experiment or simulation.

Figure 5:
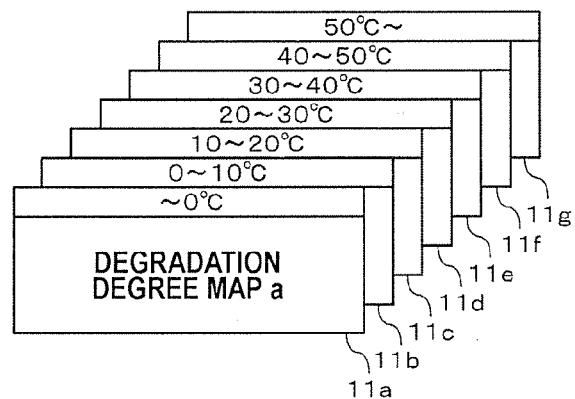
FIG. 5 is a diagram illustrating an example of a degradation degree table.

FIG. 5 is a diagram illustrating an example of degradation degree table 11 in consideration of temperatures. The degradation degree maps that organize and describe the degradation degree derived for respective combinations of the plurality of SOC regions and the plurality of current rates are prepared for respective temperature sections. In an example of FIG. 5, degradation degree map 11a of 0° C. or lower, degradation degree map 11b of from 0° C. to 10° C., degradation degree map 11c of from 10° C. to 20° C., degradation degree map 11d of from 20° C. to 30° C., degradation degree map 11e of from 30° C. to 40° C., degradation degree map 11f of from 40° C. to 50° C., and degradation degree map 11g of 50° C. or higher are prepared. The designer produces the degradation degree maps under respective environmental temperatures by experiment or simulation.

Note that the degradation degree maps for charge and the degradation degree maps for discharge may be provided separately. In this case, the degradation degree maps for charge are produced with a discharge rate fixed and a plurality of charge rates prescribed. The degradation degree maps for discharge are produced with the charge rate fixed and the plurality of discharge rates prescribed.

Returning to FIG. 2, monitoring data acquiring part 12 acquires monitoring data from secondary battery 9. Specifically, monitoring data acquiring part 12 acquires a voltage value, a current value, and a temperature value of secondary battery 9. A package of secondary battery 9 contains an unillustrated voltage detection circuit, a current detection element (for example, a shunt resistor or a Hall element), a current detection circuit, a temperature detection element (for example, a thermistor), and a temperature detection circuit. The voltage detection circuit, the current detection circuit, and the temperature detection circuit transmit the detected voltage value, current value, and temperature value to battery ECU 10, respectively.

SOC estimating part 13 estimates the SOC of secondary battery 9 based on the monitoring data acquired by monitoring data acquiring part 12. The SOC may be estimated by, for example, an open-circuit voltage (OCV) method or a current integration method. These estimation methods are general techniques, and thus detailed description thereof will be omitted.

Upper limit current determining part 14 determines an upper limit current value at a time of charge or discharge based on the SOC estimated by SOC estimating part 13 and a target degradation degree with reference to degradation degree table 11. Upper limit current determining part 14 selects degradation degree table 11 to refer to, from a plurality of reference tables with different temperature sections, based on the temperature value acquired by monitoring data acquiring part 12 from secondary battery 9. Description will be given below citing a specific example.

Figure 6:
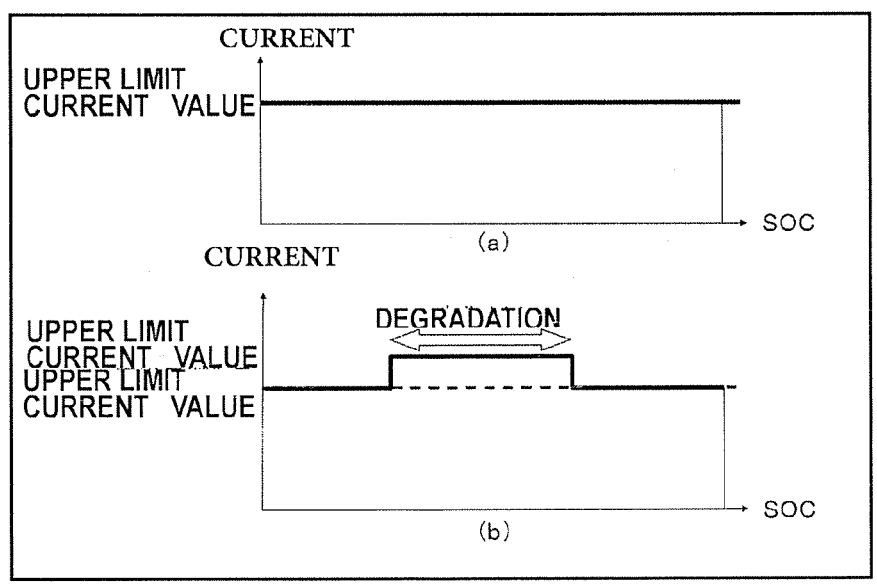
FIG. 6 is each of diagrams illustrating a basic concept of a method for determining an upper limit current value for improving fuel efficiency.

Sections (a) and (b) of FIG. 6 are diagrams illustrating a basic concept of a method for determining the upper limit current value for improving fuel efficiency. The section (a) of FIG. 6 illustrates the method for determining the upper limit current value according to a comparative example, and the section (b) of FIG. 6 illustrates an example of the method for determining the upper limit current value according to the present exemplary embodiment. In the comparative example illustrated in the section (a) of FIG. 6, an upper limit value A of current to be supplied from secondary battery 9 via inverter 8 to motor 7 is fixed in a region from the SOC of a % to the SOC of b % (for example, from the SOC of 30% to the SOC of 60%).

In contrast, in the present exemplary embodiment illustrated in the section (b) of FIG. 6, the upper limit value A of the current to be supplied to motor 7 is increased to an upper limit value B in the SOC region in which degradation of secondary battery 9 is relatively small. As the upper limit value of the current to be supplied to motor 7 increases, torque of motor 7 increases, and torque of engine 1 decreases and fuel efficiency improves accordingly. Even if the upper limit value of the current increases, a burden on secondary battery 9 does not increase because degradation is small in this SOC region.

Upper limit current determining part 14 specifies the SOC region to which the SOC estimated by SOC estimating part 13 belongs, from the degradation degree maps. When the degradation degree of the SOC region is less than a set value, upper limit current determining part 14 increases the upper limit value of discharge current. Consideration is given to an example in which the default upper limit current value A is set to 1.00 C. When the degradation degree in the SOC region to which the SOC estimated by SOC estimating part 13 belongs is less than the set value, upper limit current determining part 14 increases the upper limit current value from 1.00 C (upper limit value A) to, for example, 1.50 C (upper limit value B).

Figures 7, 8:
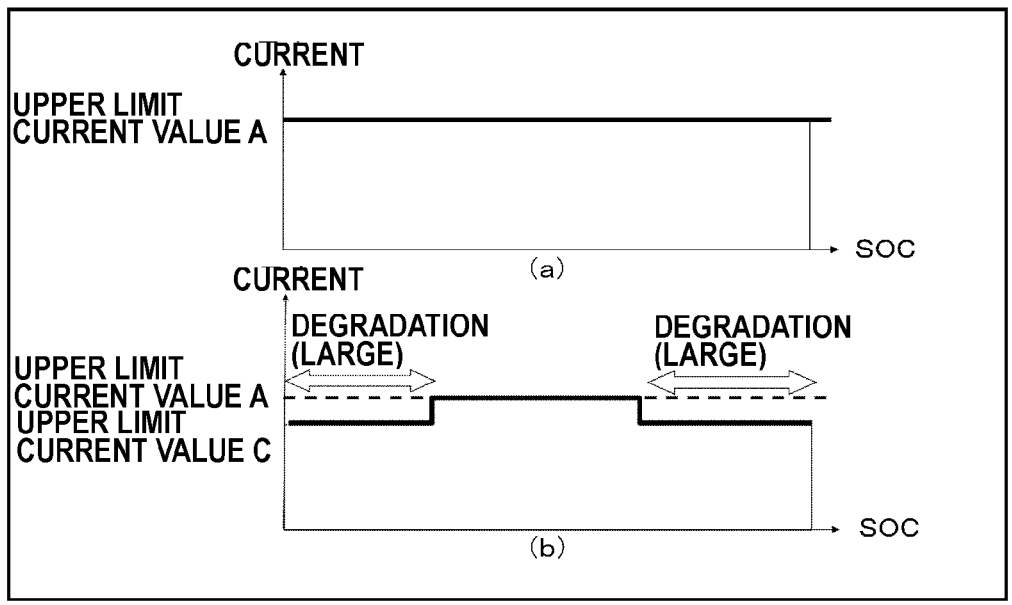
FIG. 7 is each of diagrams illustrating a basic concept of the method for determining the upper limit current value for extending a battery service life.
FIG. 8 is a diagram illustrating an example of an upper limit speed table.

Sections (a) and (b) of FIG. 7 are diagrams illustrating a basic concept of the method for determining the upper limit current value for extending a battery service life. The section (a) of FIG. 7 illustrates the method for determining the upper limit current value according to the comparative example, and the section (b) of FIG. 7 illustrates another example of the method for determining the upper limit current value according to the present exemplary embodiment. In a similar manner to the comparative example illustrated in the section (a) of FIG. 6, in the comparative example illustrated in the section (a) of FIG. 7, the upper limit value A of the current to be supplied to motor 7 is fixed in the region from the SOC of a % to the SOC of b % (for example, from the SOC of 30% to the SOC of 60%).

In contrast, in the present exemplary embodiment illustrated in the section (b) of FIG. 7, the upper limit value A of the current to be supplied to motor 7 is decreased to the upper limit value C in the SOC region in which degradation of secondary battery 9 is relatively large. As the upper limit value of the current to be supplied to motor 7 decreases, torque of motor 7 decreases accordingly, but the burden on secondary battery 9 is reduced.

Upper limit current determining part 14 specifies the SOC region to which the SOC estimated by SOC estimating part 13 belongs, from the degradation degree maps. When the degradation degree in the SOC region is larger than the set value, upper limit current determining part 14 decreases the upper limit value of discharge current. Consideration is given to an example in which the default upper limit current value A is set to 1.00 C. When the degradation degree in the SOC region to which the SOC estimated by SOC estimating part 13 belongs is larger than the set value, upper limit current determining part 14 decreases the upper limit current value from 1.00 C (upper limit value A) to, for example, 0.50 C (upper limit value C).

A method may be employed for determining the upper limit current value that achieves both improvement in fuel efficiency illustrated in the section (b) of FIG. 6 and battery degradation inhibition illustrated in the section (b) of FIG. 7. Upper limit current determining part 14 specifies the SOC region to which the SOC estimated by SOC estimating part 13 belongs, from the degradation degree maps. Then, with reference to the degradation degree in the specified SOC region and the current rate, upper limit current determining part 14 selects a largest current rate in a range in which the degradation degree does not exceed the set value, and then sets the selected largest current rate as the upper limit current value. This method for determining the upper limit current value allows electric discharge at the largest possible current rate while inhibiting degradation of secondary battery 9.

While the method for determining the upper limit current value at the time of discharge at which the electric current is supplied from secondary battery 9 to motor 7 has been described above, the method for determining the upper limit current value at the time of charge at which the electric current is regenerated from motor 7 to secondary battery 9 may also use the similar method. Using the method for determining the upper limit current value illustrated in the section (6) of FIG. 6 allows collection of larger electric power, and thus inhibits occurrence of capacity shortage of secondary battery 9. This results in inhibition of a decrease in an opportunity for motor 7 to provide an assist, leading to improvement in fuel efficiency.

Returning to FIG. 2, in response to a parameter acquisition request from parameter requesting and acquiring part 22 of HV ECU 20, parameter providing part 15 provides HV ECU 20 with specified parameter values. In the present exemplary embodiment, as the parameter values, parameter providing part 15 provides HV ECU 20 with the upper limit current value determined by upper limit current determining part 14 and the degradation degree at the time of charge and/or discharge. The degradation degree is a degradation degree corresponding to a combination condition of the SOC estimated by SOC estimating part 13 and the current rate that is set as the upper limit current value.

Upper limit speed table 21 of HV ECU 20 prescribes a relationship between the degradation degree of secondary battery 9 and an upper limit speed at which motor 7 provides a running assist to the vehicle. In addition, upper limit speed table 21 prescribes a relationship between the degradation degree of secondary battery 9 and the upper limit speed at which power regeneration is performed from motor 7. The upper limit speed at the time of a running assist corresponding to the degradation degree (hereinafter referred to as a power running upper limit speed), and the upper limit speed at the time of power regeneration corresponding to the degradation degree (hereinafter referred to as a regenerative upper limit speed) may be symmetrical, and may be asymmetrical.

FIG. 8 is a diagram illustrating an example of upper limit speed table 21. Upper limit speed table 21 illustrated in FIG. 8 is an example in which the power running upper limit speed and the regenerative upper limit speed are asymmetrical. In FIG. 8, in order to simplify description, the degradation degree at the time of discharge of secondary battery 9 and the degradation degree at the time of charge are classified into three degrees, "large", "medium", and "small". Higher power running upper limit speed leads to an increase in the opportunity for motor 7 to provide an assist, resulting in a decrease in a work load of engine 1 and improvement in fuel efficiency. Higher regenerative upper limit speed leads to inhibition of capacity shortage of secondary battery 9, also resulting in improvement in fuel efficiency.

In this example, the regenerative upper limit speed is set higher than the power running upper limit speed in order to avoid capacity shortage of secondary battery 9 as much as possible. For example, for secondary battery 9 which is not plug-in charged from the outside and which is not charged with alternator-generated power based on engine rotation, it is necessary to increase the opportunity of regenerative charge as much as possible in order to avoid capacity shortage of secondary battery 9. In addition, even when it can be assumed that power consumption by a running assist is equal to generated power at the time of deceleration, when a conversion loss in inverter 8 and wiring loss are taken into consideration, it is necessary to make charging with generated power larger than discharging by power consumption.

Returning to FIG. 2, before determination of torque distribution and regenerative control, parameter requesting and acquiring part 22 requests battery ECU 10 to provide the parameter values of secondary battery 9. In the present exemplary embodiment, parameter requesting and acquiring part 22 requests the aforementioned upper limit current value and the degradation degree, and then acquires the upper limit current value and the degradation degree from parameter providing part 15.

Upper limit speed determining part 23 determines the power running upper limit speed or the regenerative upper limit speed based on the acquired degradation degree with reference to upper limit speed table 21. As described above, the degradation degree is specified on a battery ECU 10 side based on the estimated SOC with reference to degradation degree table 11. Description will be given below citing a specific example.

Figure 9:
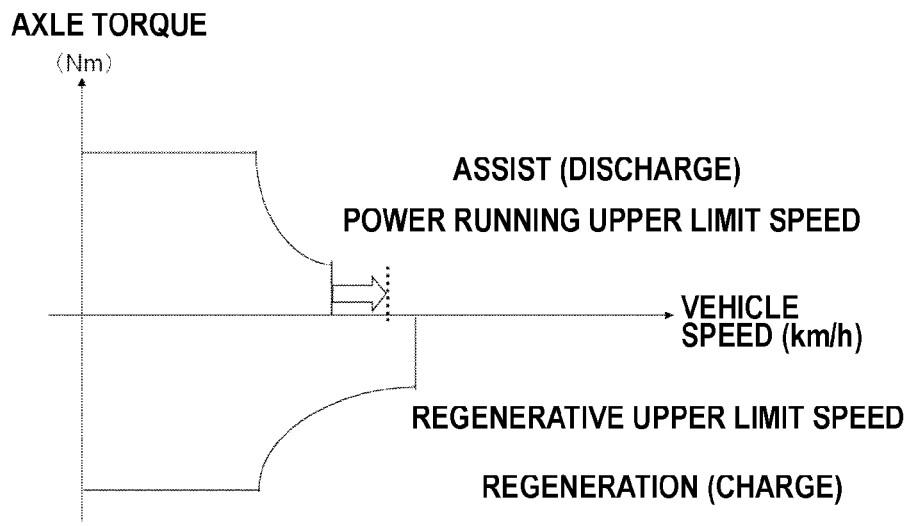
FIG. 9 is a diagram illustrating a first example of a method for determining an upper limit speed for improving fuel efficiency.

FIG. 9 is a diagram illustrating a first example of the method for determining the upper limit speed for improving fuel efficiency. The first example is an example in which the power running upper limit speed and the regenerative upper limit speed are asymmetrical, and in which only the power running upper limit speed is increased. With reference to degradation degree table 11, upper limit speed determining part 23 increases the power running upper limit speed in a range in which the degradation degree at the time of discharge acquired from battery ECU 10 satisfies the set condition. For example, based on a premise that upper limit speed table 21 of FIG. 8 is referenced, only when the degradation degree at the time of discharge acquired from battery ECU 10 corresponds to "small", the power running upper limit speed is increased from 35 km/h to 40 km/h. This leads to an increase in the opportunity for motor 7 to provide an assist, a decrease in the engine work load, and improvement in fuel efficiency. When improvement in fuel efficiency is considered more important, the power running upper limit speed may be increased even when the degradation degree at the time of discharge acquired from battery ECU 10 corresponds to "medium". However, when the degradation degree at the time of discharge acquired from battery ECU 10 corresponds to "large", the power running upper limit speed is not increased.

Figure 10:
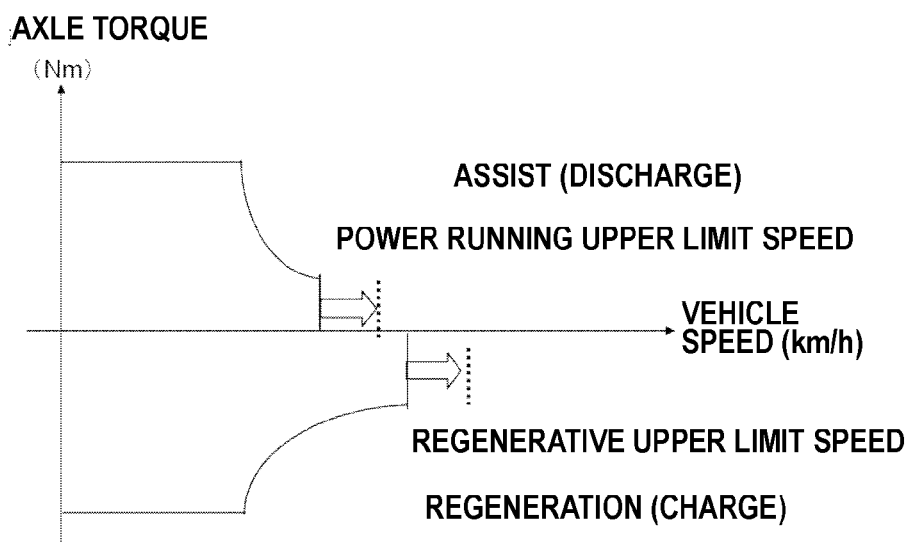
FIG. 10 is a diagram illustrating a second example of the method for determining the upper limit speed for improving fuel efficiency.

FIG. 10 is a diagram illustrating a second example of the method for determining the upper limit speed for improving fuel efficiency. The second example is also an example in which the power running upper limit speed and the regenerative upper limit speed are asymmetrical. In the second example, both of the power running upper limit speed and the regenerative upper limit speed are increased. With reference to degradation degree table 11, upper limit speed determining part 23 increases the power running upper limit speed in the range in which the degradation degree at the time of discharge acquired from battery ECU 10 satisfies the set condition. In addition, with reference to degradation degree table 11, upper limit speed determining part 23 increases the regenerative upper limit speed in the range in which the degradation degree at the time of charge acquired from battery ECU 10 satisfies the set condition. Increasing also the regenerative upper limit speed leads to inhibition of capacity shortage of secondary battery 9, resulting in improvement in fuel efficiency.

Figure 11:
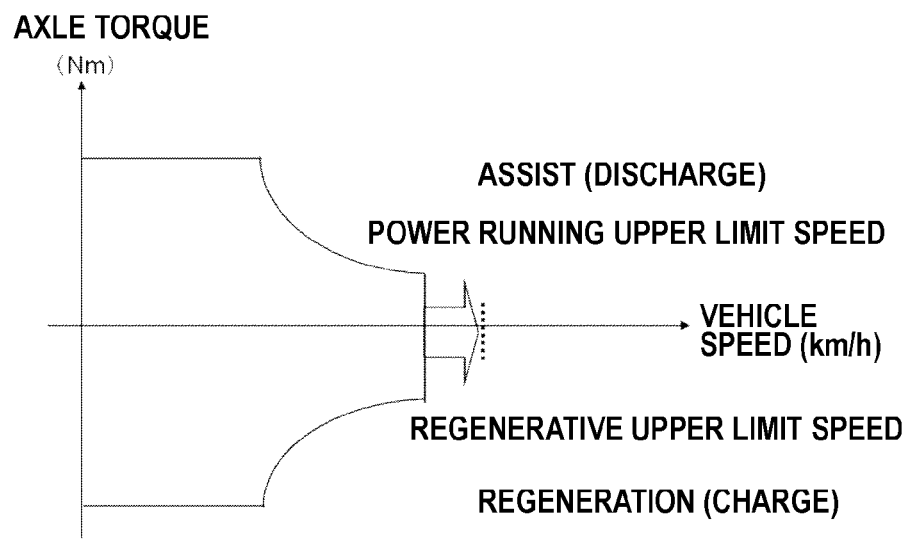
FIG. 11 is a diagram illustrating a third example of the method for determining the upper limit speed for improving fuel efficiency.

FIG. 11 is a diagram illustrating a third example of the method for determining the upper limit speed for improving fuel efficiency. The third example is an example in which the power running upper limit speed and the regenerative upper limit speed are symmetrical, and is an example in which both of the power running upper limit speed and the regenerative upper limit speed are increased. With reference to degradation degree table 11, upper limit speed determining part 23 increases the power running upper limit speed in the range in which the degradation degree at the time of discharge acquired from battery ECU 10 satisfies the set condition. Similarly, with reference to degradation degree table 11, upper limit speed determining part 23 increases the regenerative upper limit speed in the range in which the degradation degree at the time of charge acquired from battery ECU 10 satisfies the set condition.

Figure 12:
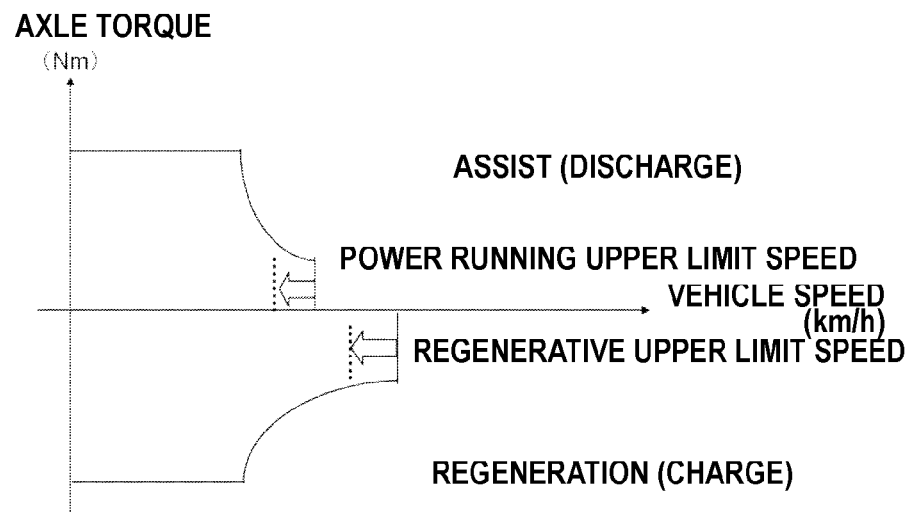
FIG. 12 is a diagram illustrating a first example of the method for determining the upper limit speed for extending a battery service life.

FIG. 12 is a diagram illustrating a first example of the method for determining the upper limit speed for extending a battery service life. The first example is an example in which the power running upper limit speed and the regenerative upper limit speed are asymmetrical, and is an example in which both of the power running upper limit speed and the regenerative upper limit speed are decreased. With reference to degradation degree table 11, upper limit speed determining part 23 decreases the power running upper limit speed in the range in which the degradation degree at the time of discharge acquired from battery ECU 10 satisfies the set condition. For example, based on a premise that upper limit speed table 21 of FIG. 8 is referenced, only when the degradation degree at the time of discharge acquired from battery ECU 10 corresponds to "large", the power running upper limit speed is decreased from 35 km/h to 30 km/h. This leads to reduction in the burden on secondary battery 9. When battery protection is considered more important, the power running upper limit speed may be decreased even when the degradation degree at the time of discharge acquired from battery ECU 10 corresponds to "medium". However, when the degradation degree at the time of discharge acquired from battery ECU 10 corresponds to "small", the power running upper limit speed is not decreased. When the burden on the battery is small, a certain degree of fuel efficiency improvement effect is also secured.

Figure 13:
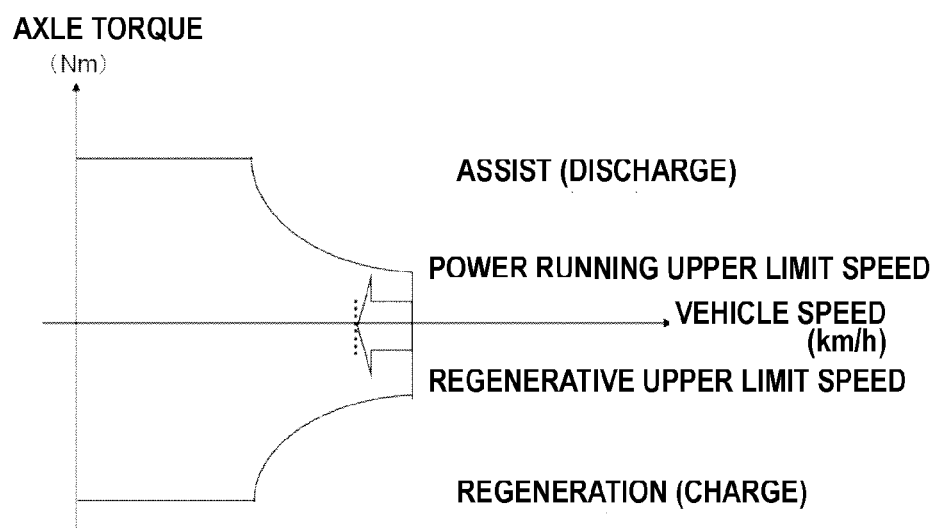
FIG. 13 is a diagram illustrating a second example of the method for determining the upper limit speed for extending a battery service life.

FIG. 13 is a diagram illustrating a second example of the method for determining the upper limit speed for extending a battery service life. The second example is an example in which the power running upper limit speed and the regenerative upper limit speed are symmetrical, and is an example in which both of the power running upper limit speed and the regenerative upper limit speed are decreased. With reference to degradation degree table 11, upper limit speed determining part 23 decreases the power running upper limit speed in the range in which the degradation degree at the time of discharge acquired from battery ECU 10 satisfies the set condition. Similarly, with reference to degradation degree table 11, upper limit speed determining part 23 decreases the regenerative upper limit speed in the range in which the degradation degree at the time of charge acquired from battery ECU 10 satisfies the set condition.

Returning to FIG. 2, torque distribution determining part 24 determines distribution of engine torque and motor torque to request torque. Torque distribution determining part 24 acquires an accelerator opening from an unillustrated ECU that controls an accelerator, and acquires a number of rotations of engine 1 from engine ECU 30. Torque distribution determining part 24 calculates the request torque requested by the driver from the accelerator opening and the number of rotations of engine 1. With reference to an unillustrated assist map, torque distribution determining part 24 determines optimum distribution of the engine torque and the motor torque to the request torque. Note that the present specification does not focus attention on a technique of achieving optimum torque distribution, and thus specific description of the torque distribution will be omitted. The designer may arbitrarily select and employ one of torque distribution algorithms known at the filing of this application.

When determining the distribution of the engine torque and the motor torque to the request torque, torque distribution determining part 24 follows limitations on the upper limit current value at the time of discharge described above. Specifically, torque distribution determining part 24 calculates the motor torque obtained when motor 7 operates at the current rate according to the upper limit current value, and then compares this motor torque with the motor torque distributed by the torque distribution algorithm. When the former is smaller than the latter, the motor torque to be distributed to motor 7 is replaced with the former. In this case, torque distribution determining part 24 adds a difference between the motor torque before the replacement and the motor torque after the replacement, to the engine torque to be distributed to engine 1.

In addition, when determining the distribution of the engine torque and the motor torque to the request torque, torque distribution determining part 24 also follows limitations on the power running upper limit speed described above. Specifically, when a vehicle speed obtained from a vehicle speed sensor exceeds the power running upper limit speed, torque distribution determining part 24 decreases, to zero, the motor torque to be distributed to motor 7.

Torque distribution determining part 24 transmits the determined engine torque to engine ECU 30. Engine ECU 30 converts the engine torque received from HV ECU 20 into an engine throttle opening to control the engine throttle. Torque distribution determining part 24 transmits the upper limit current value at the time of discharge described above to a drive circuit included in inverter 8. The drive circuit generates a driving signal for driving switching elements (for example, insulated gate bipolar transistor (IGBT), metal oxide semiconductor field-effect transistor (MOSFET)) included in inverter 8, based on the upper limit current value received from HV ECU 20. For example, the drive circuit controls a duty ratio of the switching elements, or a phase difference between the switching elements that constitute an identical arm, to adjust an amount of power to be taken out from secondary battery 9 to motor 7.

On receipt of a signal indicating that the accelerator opening has become zero during vehicle running from an unillustrated ECU that controls the accelerator, torque distribution determining part 24 transmits the upper limit current value at the time of charge described above to the drive circuit included in inverter 8. Based on the upper limit current value received from HV ECU 20, the drive circuit generates the driving signal for the switching elements included in inverter 8. The amount of power to be taken out from motor 7 to secondary battery 9 is adjusted accordingly.

At the time of regenerative control, torque distribution determining part 24 follows limitations on the regenerative upper limit speed described above. Specifically, when the vehicle speed obtained from the vehicle speed sensor exceeds the regenerative upper limit speed, torque distribution determining part 24 transmits a breaking signal to inverter 8 to break regeneration from motor 7 to secondary battery 9.

Figure 14:
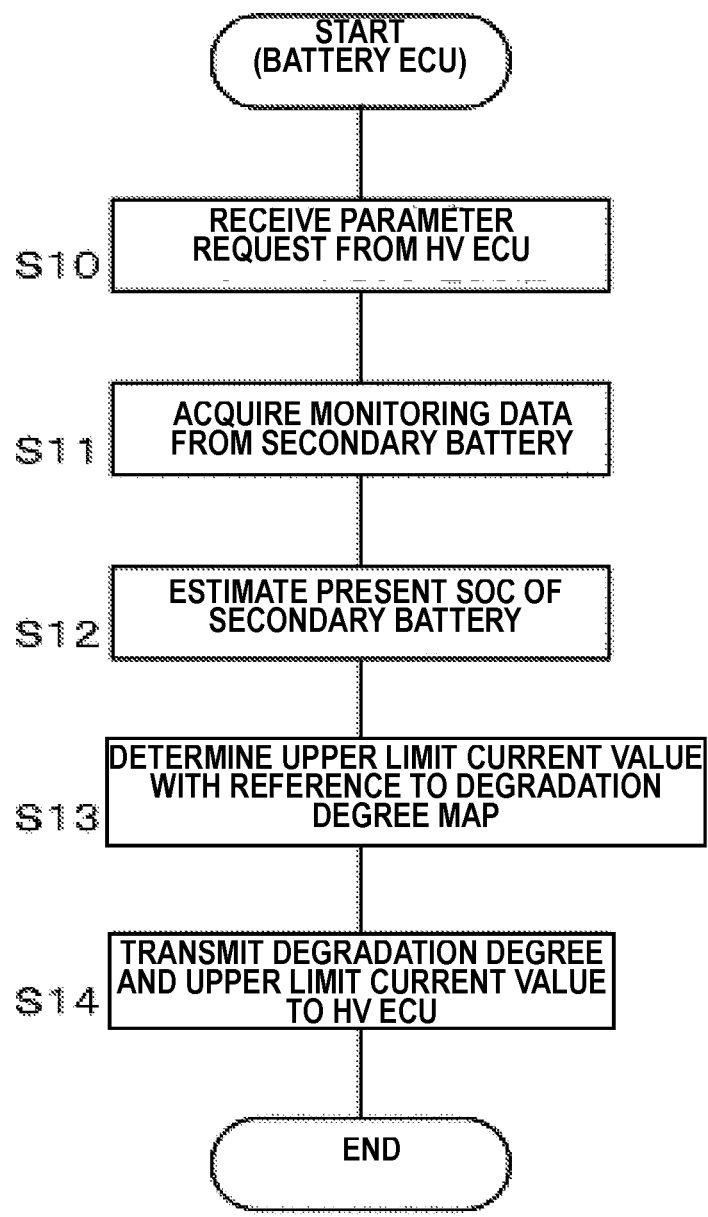
FIG. 14 is a flowchart illustrating an operation of the battery ECU according to the exemplary embodiment of the present invention.

FIG. 14 is a flowchart illustrating an operation of battery ECU 10 according to the exemplary embodiment of the present invention. Parameter providing part 15 receives the parameter acquisition request from HV ECU 20 (S10).

Monitoring data acquiring part 12 acquires the voltage value, the current value, and the temperature value from secondary battery 9 as the monitoring data (S11). Monitoring data acquiring part 12 estimates the present SOC of secondary battery 9 based on the monitoring data (S12). Upper limit current determining part 14 determines the upper limit current value based on the estimated SOC and the temperature value of secondary battery 9 with reference to the degradation degree maps (S13). Parameter providing part 15 transmits the determined upper limit current value and the degradation degree under a determined condition to HV ECU 20 as the parameter (S14).

Figure 15:
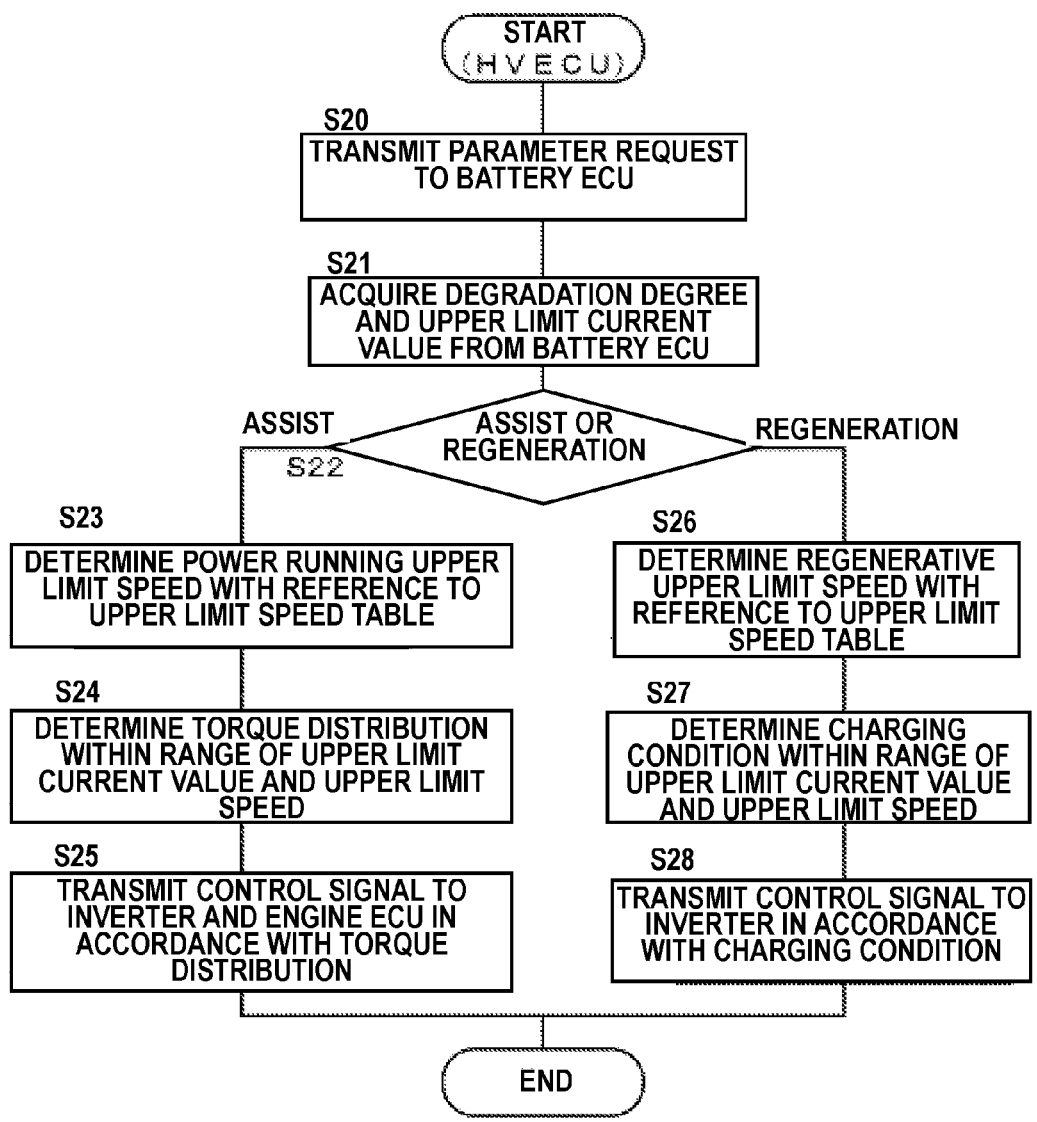
FIG. 15 is a flowchart illustrating an operation of the HV ECU according to the exemplary embodiment of the present invention.

FIG. 15 is a flowchart illustrating an operation of HV ECU 20 according to the exemplary embodiment of the present invention. Parameter requesting and acquiring part 22 transmits the parameter acquisition request to battery ECU 10 (S20). Parameter requesting and acquiring part 22 acquires the aforementioned upper limit current value and the degradation degree from battery ECU 10 as the parameter (S21).

In a situation where motor 7 should provide a running assist, ("ASSIST" in S22), upper limit speed determining part 23 determines the power running upper limit speed based on the acquired degradation degree at the time of discharge with reference to upper limit speed table 21 (S23). Torque distribution determining part 24 determines the distribution of the engine torque and the motor torque to the request torque within a range of the acquired upper limit current value at the time of discharge and the determined power running upper limit speed (S24). Torque distribution determining part 24 transmits a control signal to each of engine ECU 30 and inverter 8 in accordance with the determined distribution (S25).

In a situation where motor 7 should perform regenerative power generation ("REGENERATION" in S22), upper limit speed determining part 23 determines the regenerative upper limit speed based on the acquired degradation degree at the time of charge with reference to upper limit speed table 21 (S26). Torque distribution determining part 24 determines a charging condition within the range of the acquired upper limit current value at the time of charge and the determined regenerative upper limit speed (S27). Torque distribution determining part 24 transmits the control signal to inverter 8 in accordance with the determined charging condition (S28).

As described above, according to the present exemplary embodiment, since the upper limit current and/or upper limit speed is determined based on the degradation degree maps of secondary battery 9, degradation inhibition of secondary battery 9 or improvement in fuel efficiency may be achieved. In addition, both degradation inhibition of secondary battery 9 and improvement in fuel efficiency may be achieved in a well-balanced manner.

In the aforementioned processing for determining the upper limit current and/or upper limit speed, description has been given of fuel efficiency improvement-oriented settings (hereinafter referred to as a fuel efficiency-oriented mode), battery service life-oriented settings (hereinafter referred to as a battery-oriented mode), and settings responding to both the requirements (hereinafter referred to as a balanced mode). A design may be employed that allows a driver to specify selection of one of the fuel efficiency-oriented mode, the battery-oriented mode, and the balanced mode. In addition, a design may be employed that causes battery ECU 10 or HV ECU 20 to select one of the modes based on a degradation state of secondary battery 9 or a running pattern of the driver.

Figure 16:
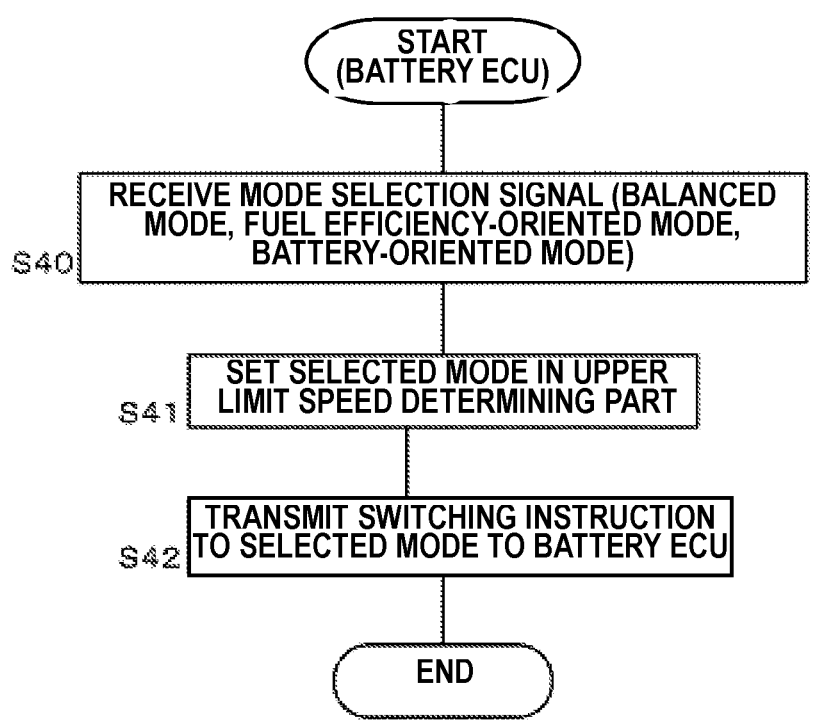
FIG. 16 is a flowchart for describing a first example of a mode selection method.

FIG. 16 is a flowchart for describing a first example of a mode selection method. The first example is an example in which the driver may select the mode. For example, the driver operates a user interface on a dashboard to select the mode. On receipt of a mode selection signal from an ECU that controls the user interface, HV ECU 20 sets the selected mode in upper limit speed determining part 23 (S41). HV ECU 20 transmits a switching instruction to the selected mode to battery ECU 10 (S42). Battery ECU 10 sets the selected mode in upper limit current determining part 14.

Figure 17:
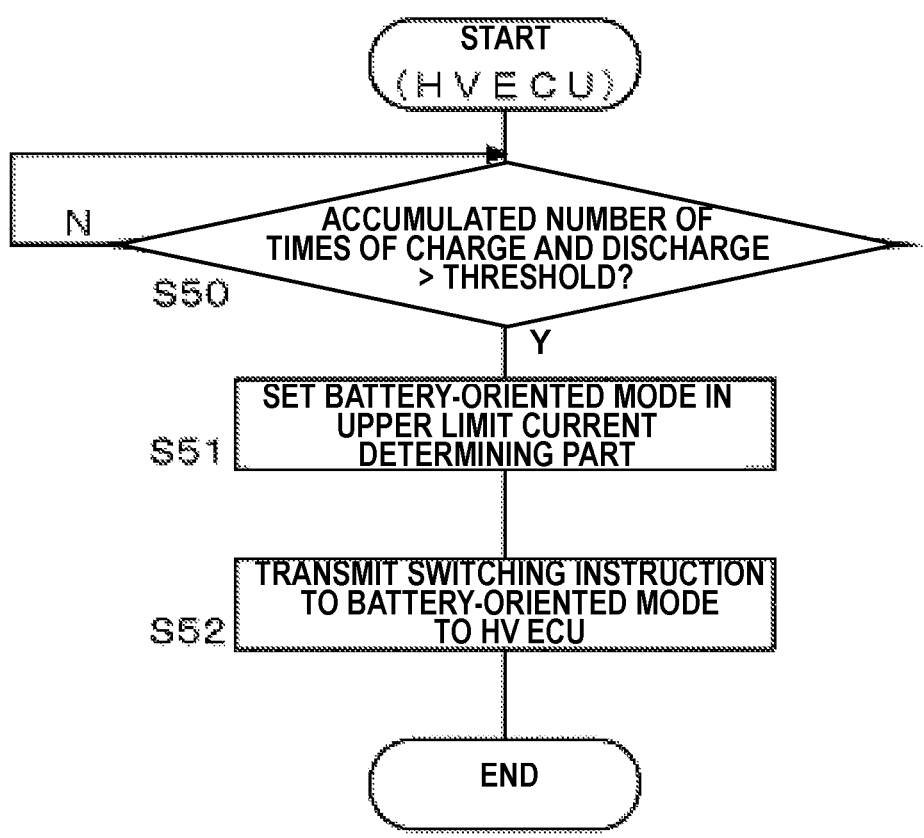
FIG. 17 is a flowchart for describing a second example of the mode selection method.

FIG. 17 is a flowchart for describing a second example of the mode selection method. The second example is an example in which the mode is switched in consideration of degradation of secondary battery 9. The second example assumes that battery ECU 10 records an accumulated number of times of charge and discharge of secondary battery 9. When the accumulated number of times of charge and discharge of secondary battery 9 exceeds a predetermined threshold (Y in S50), battery ECU 10 sets the battery-oriented mode in upper limit current determining part 14 (S51). When the fuel efficiency-oriented mode or the balanced mode has been set, battery ECU 10 changes the mode into the battery-oriented mode. When the battery-oriented mode has been set, battery ECU 10 maintains the settings. Battery ECU 10 transmits the switching instruction to the battery-oriented mode to HV ECU 20 (S52). HV ECU 20 sets the battery-oriented mode in upper limit speed determining part 23.

The present invention has been described above based on the exemplary embodiments. It will be appreciated by the person of ordinary skill in the art that this exemplary embodiment is illustrative, that various variations may be made in combination of configuration elements and processing processes of the exemplary embodiment, and that such variations are also within the scope of the present invention.

In the aforementioned exemplary embodiment, battery ECU 10 performs SOC estimation processing and upper limit current determination processing, and HV ECU 20 performs upper limit speed determination processing, torque distribution processing, and inverter 8 control. Such division of these processing processes is one example, and these processing processes may be arbitrarily divided between battery ECU 10 and HV ECU 20. In addition, an ECU that integrates battery ECU 10 and HV ECU 20 may be used, and this ECU may perform these processing processes collectively.

In addition, while the aforementioned exemplary embodiment has described an example in which both of limitation processing with the upper limit current and limitation processing with the upper limit speed are performed, only one of these types of limitation processing may be performed. When only the limitation processing with the upper limit current is performed, upper limit speed table 21 and upper limit speed determining part 23 are unnecessary. On the other hand, when only the limitation processing with the upper limit speed is performed, degradation degree table 11 and upper limit current determining part 14 are unnecessary.

In addition, the aforementioned exemplary embodiment has described an example of describing the degradation degree for each of the plurality of types of current rates in the degradation degree maps. In this regard, the current rate may be one type. In this case, specification of the SOC region with the estimated SOC will lead to specification of the degradation degree of secondary battery 9 uniquely.

In addition, the aforementioned exemplary embodiment has described an example of describing the degradation degree for each SOC region in degradation degree table 11. In this regard, a graph, an equation, and the like may describe the degradation degree instead of degradation degree table 11. Upper limit current determining part 14 refers to the degradation degree described in one of these formats as first associated data to determine the upper limit current value.

In addition, the aforementioned exemplary embodiment has described an example of describing association of the degradation degree with the upper limit speed in upper limit speed table 21. In this regard, a graph, an equation, and the like may describe the association of the degradation degree with the upper limit speed instead of upper limit speed table 21. Upper limit speed determining part 23 refers to the association of the degradation degree with the upper limit speed described in one of these formats as second associated data to determine the upper limit speed.

Note that the exemplary embodiment may be specified by the following items.

[Item 1]

A control system including:

first associated data that describes a degradation degree of secondary battery 9 when secondary battery 9 is charged or discharged at a prescribed current rate, the first associated data describing the degradation degree in each of a plurality of state of charge (SOC) regions obtained through division of an SOC range of secondary battery 9 into the plurality of regions;

monitoring data acquiring part 12 that acquires monitoring data from secondary battery 9;

SOC estimating part 13 that estimates the SOC of secondary battery 9 based on the acquired monitoring data; and upper limit current determining part 14 that determines an upper limit current value to be used as a current rate at a time of charge or discharge, based on the estimated SOC and a target degradation degree with reference to the first associated data.

This may inhibit the degradation of secondary battery 9.

[Item 2]

The control system according to item 1, wherein upper limit current determining part 14 decreases the upper limit current value when the degradation degree in each of the SOC regions to which the SOC estimated by SOC estimating part 13 belongs is larger than a first set value.

This may inhibit the degradation of secondary battery 9.

[Item 3]

The control system according to item 1 or 2, wherein upper limit current determining part 14 increases the upper limit current value when the degradation degree in each of the SOC regions to which the SOC estimated by SOC estimating part 13 belongs is smaller than a second set value.

This may increase torque of a load that receives electric power supplied from secondary battery 9, while inhibiting the degradation of secondary battery 9.

[Item 4]

The control system according to item 1, wherein the first associated data describes the degradation degree when secondary battery 9 is charged or discharged at a plurality of types of the current rates in each of the plurality of SOC regions obtained through division of the SOC range of secondary battery 9 into the plurality of regions, and upper limit current determining part 14 selects a largest current rate within a range in which the degradation degree does not exceed a third set value with reference to the degradation degree in each of the SOC regions to which the SOC estimated by SOC estimating part 13 belongs and to each of the current rates, to set the selected largest current rate as the upper limit current value.

This may optimize torque of a load while inhibiting the degradation of secondary battery 9.

[Item 5]

The control system according to any one of items 1 to 4, wherein the first associated data is provided for each of a plurality of temperature sections, monitoring data acquiring part 12 acquires a temperature of secondary battery 9 from secondary battery 9, and upper limit current determining part 14 selects the first associated data to refer to, based on the acquired temperature.

This may set the upper limit current value more optimally.

[Item 6]

The control system according to any one of items 1 to 5, wherein control system 40 controls secondary battery 9 for supplying electric power to motor 7 for vehicle running, control system 40 further includes:

second associated data that associates a relationship between the degradation degree of secondary battery 9 and an upper limit speed at which motor 7 provides a running assist to vehicle 100; and upper limit speed determining part 23 that determines, with reference to the second associated data, the upper limit speed at which motor 7 provides the running assist, based on the degradation degree specified based on the estimated SOC with reference to the first associated data.

This may determine an optimum upper limit assist speed in consideration of the degradation of secondary battery 9.

[Item 7]

The control system according to item 6, wherein motor 7 generates electricity by using deceleration energy at a time of vehicle deceleration, the second associated data further prescribes a relationship between the degradation degree of secondary battery 9 and the upper limit speed at which power regeneration is performed from motor 7, and upper limit speed determining part 23 determines, with reference to the second associated data, the upper limit speed at which power regeneration is performed from motor 7, based on the degradation degree specified based on the estimated SOC with reference to the first associated data.

This may determine an optimum regenerative upper limit speed in consideration of the degradation of secondary battery 9.

[Item 8]

A control system for controlling secondary battery 9 for supplying electric power to a motor 7 for vehicle running, the control system including:

first associated data that describes a degradation degree of secondary battery 9 when secondary battery 9 is charged or discharged at a prescribed current rate, the first associated data describing the degradation degree in each of a plurality of state of charge (SOC) regions obtained through division of an SOC range of secondary battery 9 into the plurality of regions;

second associated data that associates a relationship between the degradation degree of secondary battery 9 and an upper limit speed at which motor 7 provides a running assist to vehicle 100;

monitoring data acquiring part 12 that acquires monitoring data from secondary battery 9;

SOC estimating part 13 that estimates the SOC of secondary battery 9 based on the acquired monitoring data; and upper limit speed determining part 23 that specifies the degradation degree based on the estimated SOC with reference to the first associated data, upper limit speed determining part 23 determining the upper limit speed at which the motor provides a running assist, based on the degradation degree with reference to the second associated data.

This may determine an optimum upper limit assist speed in consideration of the degradation of secondary battery 9.

[Item 9]

Vehicle power supply device 50 including:

secondary battery 9 for supplying electric power to motor 7 for vehicle running; and control system 40 according to any one of items 1 to 5, control system 40 being configured to control secondary battery 9.

This may achieve degradation inhibition of secondary battery 9 or increase in torque of a load.

INDUSTRIAL APPLICABILITY

The present invention may be used to control the secondary battery mounted in the vehicle.

The invention claimed is:

1. A control system comprising:
   first associated data that describes a degradation degree of a secondary battery when the secondary battery is charged or discharged, the first associated data describing the degradation degree in each of a plurality of state of charge (SOC) regions obtained by dividing an SOC range of the secondary battery into the plurality of regions; and
   a processor or control circuit configured to:
      acquire monitoring data from the secondary battery;
      estimate the SOC of the secondary battery based on the acquired monitoring data; and
      determine an upper limit current value to be used as a current rate at a time of charge or discharge,
   wherein the processor or control circuit determines the upper limit current value based on the estimated SOC and a target degradation degree with reference to the first associated data, and
   wherein an amount of power to or from the secondary battery is to be adjusted by the control system based at least in part on the upper limit current value.

2. The control system according to claim 1, wherein the processor or control circuit decreases the upper limit current value when the degradation degree in one of the SOC regions to which the SOC estimated by the processor or control circuit belongs is larger than a first set value.

3. The control system according to claim 2, wherein the processor or control circuit increases the upper limit current value when the degradation degree in one of the SOC regions to which to SOC estimated by the processor or control circuit belongs is smaller than a second set value.

4. The control system according to claim 1, wherein the processor or control circuit increases the upper limit current value when the degradation degree in one of the SOC regions to which to SOC estimated by the processor or control circuit belongs is smaller than a second set value.

5. The control system according to claim 1, wherein
   the first associated data describes the degradation degree when the secondary battery is charged or discharged at a plurality of current rates in each of the plurality of SOC regions obtained by dividing the SOC range of the secondary battery into the plurality of regions, and
   the processor or control circuit selects a largest current rate within a range in which the degradation degree does not exceed a third set value, with reference to the degradation degree in one of the SOC regions to which the SOC estimated by the processor or control circuit belongs and to each of the current rates, to set the selected largest current rate as the upper limit current value.

6. The control system according to claim 1, wherein
the first associated data is provided for each of a plurality of temperature sections,
the processor or control circuit acquires a temperature of the secondary battery from the secondary battery, and
the processor or control circuit selects the first associated data to refer to, based on the acquired temperature.

7. The control system according to claim 1, wherein
the control system controls the secondary battery for supplying electric power to a motor for vehicle running,
the control system further comprises:
second associated data that associates a relationship between the degradation degree of the secondary battery and an upper limit speed at which the motor provides a running assist to the vehicle; and
the processor or control circuit, or a second processor or second control circuit, that determines, with reference to the second associated data, the upper limit speed at which the motor provides the running assist, based on the degradation degree specified based on the estimated SOC with reference to the first associated data.

8. The control system according to claim 7, wherein
the motor generates electricity by using deceleration energy at a time of vehicle deceleration,
the second associated data further prescribes a relationship between the degradation degree of the secondary battery and the upper limit speed at which power regeneration is performed from the motor, and
the processor or control circuit, or the second processor or second control circuit, determines, with reference to the second associated data, the upper limit speed at which the power regeneration is performed from the motor, based on the degradation degree specified based on the estimated SOC with reference to the first associated data.

9. The control system according to claim 1, wherein the degradation degree is an index that prescribes a capacity retention ratio from a viewpoint of degradation.

10. The control system according to claim 9, wherein the degradation degree increases as the capacity retention ratio decreases.

11. The control system according to claim 1 It wherein the degradation degree decreases as the capacity retention ratio increases.

12. The control system according to claim 1, wherein the plurality of regions define a plurality of degradation degree maps generated in consideration of temperatures, respectively.

13. The control system according to claim 12, wherein the plurality of degradation degree maps include separately provided maps for charge and maps for discharge.

14. The control system according to claim 13, wherein the maps for charge are produced with a discharge rate fixed and a plurality of charge rates prescribed.

15. The control system according to claim 13, wherein maps for discharge are produced with a charge rate fixed and a plurality of discharge rates prescribed.

16. A control system for controlling a secondary battery for supplying electric power to a motor for vehicle running, the control system comprising:
first associated data that describes a degradation degree of the secondary battery when the secondary battery is charged or discharged at a prescribed current rate, the first associated data describing the degradation degree in each of a plurality of state of charge (SOC) regions obtained by dividing an SOC range of the secondary battery into the plurality of regions;
second associated data that associates a relationship between the degradation degree of the secondary battery and an upper limit speed at which the motor provides a running assist to the vehicle; and
a processor or control circuit configured to:
acquire monitoring data from the secondary battery;
estimate the SOC of the secondary battery based on the acquired monitoring data;
specify the degradation degree based on the estimated SOC with reference to the first associated data; and
determine the upper limit speed at which the motor provides a running assist, based on the degradation degree with reference to the second associated data,
wherein an amount of power to or from the secondary battery is to be adjusted by the control system based at least in part on the upper limit speed.

17. A vehicle power supply device comprising:
a secondary battery for supplying electric power to a motor for vehicle running; and
a control system comprising:
first associated data that describes a degradation degree of a secondary battery when the secondary battery is charged or discharged, the first associated data describing the degradation degree in each of a plurality of state of charge (SOC) regions obtained by dividing an SOC range of the secondary battery into the plurality of regions; and
a processor or control circuit configured to:
acquire monitoring data from the secondary battery;
estimate the SOC of the secondary battery based on the acquired monitoring data; and
determine an upper limit current value to be used as a current rate at a time of charge or discharge,
wherein the processor or control circuit determines the upper limit current value based on the estimated SOC and a target degradation degree with reference to the first associated data, and
wherein the control system is configured to control the secondary battery such that an amount of power to or from the secondary battery is to be adjusted by the control system based at least in part on the upper limit current value.

* * * * *